(12) United States Patent
Kabalnov et al.

(10) Patent No.: US 7,270,407 B2
(45) Date of Patent: Sep. 18, 2007

US007270407B2

(54) METHODS FOR DIGITALLY PRINTING ON CERAMICS

(75) Inventors: Alexey S Kabalnov, Corvallis, OR (US); Loren E Johnson, Corvallis, OR (US); Donald E. Wenzel, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1143 days.

(21) Appl. No.: 09/895,468

(22) Filed: Jun. 29, 2001

(65) Prior Publication Data

US 2003/0011648 A1 Jan. 16, 2003

(51) Int. Cl.
*B41J 2/01* (2006.01)
(52) U.S. Cl. .................... 347/101; 347/105
(58) Field of Classification Search ............. 347/1, 347/100, 103, 105, 101.105, 95, 96; 101/35
See application file for complete search history.

(56) References Cited

U.S. PATENT DOCUMENTS

| | | | | |
|---|---|---|---|---|
| 4,136,076 | A * | 1/1979 | Daniels | 260/29.6 |
| 4,256,493 | A * | 3/1981 | Yokoyama et al. | 106/22 |
| 5,407,474 | A | 4/1995 | Airey et al. | |
| 5,681,643 | A * | 10/1997 | Noguchi et al. | 428/195 |
| 5,714,236 | A * | 2/1998 | Withington et al. | 428/195 |
| 5,891,232 | A * | 4/1999 | Moffatt et al. | 106/31.89 |
| 6,106,113 | A * | 8/2000 | Yamazaki et al. | 347/103 |
| 6,244,700 | B1 * | 6/2001 | Kimura et al. | 347/102 |
| 6,283,589 | B1 * | 9/2001 | Gelbart | 347/101 |
| 6,357,868 | B1 * | 3/2002 | Pfaff et al. | 347/99 |

FOREIGN PATENT DOCUMENTS

| | | | |
|---|---|---|---|
| EP | 0 572 314 | | 5/1993 |
| EP | 0960873 | * | 12/1999 |
| GB | 2 274 847 | | 8/1994 |
| JP | 08253358 | | 10/1996 |
| JP | 2001039092 | | 2/2001 |
| WO | WO 00/63136 | | 10/2000 |
| WO | WO 01/51573 | | 7/2001 |

OTHER PUBLICATIONS

"Application of a Continuous INk Jet printer to Solid Freeforming of Ceramics'" P.F. Blazdell, J.R.G. Evans, Dept of Materials Engineering, Brunel University, Uxbridge, Middlesex UB8 3PH, UK, Sep. 30, 1999, Journal of Materials Processing Technology.
Microengineering of Ceramics by Direct Ink-Jet Printing:, Matthew Mott, Jun-Hua Song, and Julian R. Evans, Dept. of Materials Engineering, Brunel University, Uxbridge, Middlesex UB8 3PH, UK, Journal of American Ceramic Society, vol. 82. No. 7.
"Formulation and Multilayer Jet Printing of Ceramic Inks", Jun Hua Song, Mohan J. Edirisinghe and Julian R.G. Evans, Dept. of Materials Engineering, Brunel University, Uxbridge, Middlesex UB8 3PH, UK, Journal of American Ceramic Society, vol. 82. No. 12.
"Zirconia/alumina functionnally graded material made by ceramic ink jet printing", M. Mott, J.R. G. Evans, Dept. of Materials Engineering, Brunel University, Uxbridge, Midlesex. UB3 3PH, UK, Materials Science Engineering A27 (1999) 344-352.

* cited by examiner

*Primary Examiner*—Stephen Meier
*Assistant Examiner*—Ly T. Tran

(57) ABSTRACT

Methods for digitally printing on various articles, particularly ceramic articles, are disclosed. A first step includes applying a fluid glazing material to an article creating a coated surface. The fluid glazing material can either contain an underprinting agent for accepting and adhering chromophores to the fluid glazing material, or the underprinting agent can be jetted onto the fluid glazing material prior to the jetting of chromophores onto the article. A chromophore-containing fluid is then jetted onto the ceramic article and the article is fired. Additionally, an inkjettable composition is disclosed having a large amount of metal ion present in the composition.

8 Claims, No Drawings

METHODS FOR DIGITALLY PRINTING ON CERAMICS

FIELD OF THE INVENTION

The present invention is drawn to methods for digitally printing on glazed articles, including glazed ceramic articles.

BACKGROUND OF THE INVENTION

In recent years, computer printer technology has evolved to a point where very high resolution images can be transferred to various types of media. Ink jet printing is one particular type of printing that involves the placement of small drops of fluid ink onto a media surface in response to a digital signal. Typically, the fluid ink is placed or jetted onto the surface without physical contact between the printing device and the surface. Within the general area of ink jet printing, the specific method that the ink jet ink is deposited onto the printing surface varies from system to system, and can include continuous ink deposit and drop-on-demand ink deposit.

With regard to continuous printing systems, inks used are typically solvent based such as methyl ethyl ketone and ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink jet inks are typically mixtures of water and water-soluble solvents, e. g., glycols. Essentially, with these systems, ink droplets are propelled from a nozzle by a steam bubble generated by heat (in thermal ink-jet) or by a pressure wave (in piezo ink-jet) such that all of the ink droplets ejected are used to form the printed image.

There are several reasons that ink jet printing has become a popular way of recording images on various media surfaces. Some of these reasons include low printer noise, capability of high speed recording, and multi-color recording. Additionally, these advantages can be obtained at a relatively low price to consumers. However, though there has been great improvement in ink jet printing, accompanying this improvement are increased demands by consumers in this area, e.g., higher speeds, higher resolution, full color image formation, increased stability, new applications, etc.

The concept of utilizing ink jet technology in the area of ceramics is not a new concept. For example, ceramic "inks" for forming ceramic components in a multi-layer printing process have been disclosed. Specifically, zirconia-containing inks, or ceramic powder-containing inks, have been successfully printed to produce 2.5 mm thick bars. See, *Formulation and Multilayer Jet Printing of Ceramic Inks*, Song, et al., *J. Am. Ceram. Soc.* 82 [12] 3374-80 (1990). Additionally, a modified drop-on-demand ink jet printer has been used to build 3-D ceramic structures with cavities and overhangs. Inks used to create these structures consist of zirconia and carbon suspensions. See, *Microengineering of Ceramics by Direct Ink-Jet Printing*, Mott, et al., *J. Am. Ceram. Soc.* 82 [7] 1653-8 (1999). In another publication, a continuous ink jet printer was shown to be effective for the direct freeforming of ceramics by multiple overprinting. See, *Application of a Continuous Ink Jet Printer to Solid Freeforming of Ceramics*, Blazdell, et al., *J. Mater. Proc. Tech.* 94-102 (1999). A thin, zirconia-alumina, one-dimensional, functionally graded material has been printed by ink jet technology to form a ceramic layer having a step height comparable to the particle diameter dispersed within the composition. Thus, a fine distribution of grains can be formed through ink jet printing technologies. See, *Zirconia/alumina Functionally Graded Material Made by Ceramic Ink Jet Printing,* Mott, et al., *Mater. Sci. Eng.* A271 341-352 (1999).

Though ink jet printing technology has been used previously in the ceramic arts, particularly for the building up of ceramic layer(s), it would be useful to provide methods for coloring ceramic and other glazed articles with ink jet ink depositing technologies, including drop-on-demand systems.

SUMMARY OF THE INVENTION

The present invention is drawn to methods for digitally printing on a ceramic article. In one method, the printing can be effectuated by applying a fluid glazing material to an article creating a coated surface on the article, jetting a chromophore-containing fluid onto the coated surface, and firing the article. Optionally, an underprinting agent can be applied to the fluid glazing material. Two possibilities include providing a fluid glazing material that already contains (or is admixed with) the underprinting agent, and/or jetting the fluid primer containing the underprinting agent onto the coated surface. Under either scenario, the fluid primer can contact the chromophore-containing fluid, providing a desired effect. Though any glazed article can be printed on, it is preferred that the article be a ceramic article.

Also, a method for digitally printing on an article is disclosed wherein a transfer medium (such as paper, plastic, cloth, etc.) is used to apply the image to the article. The steps of this embodiment include applying a fluid glazing material to the article creating a coated surface, jetting an chromophore-containing fluid onto a transfer medium, adhering the transfer medium to the coated surface, and firing the article having the transfer medium adhered thereto. In one embodiment, a coating of glaze can be applied over the transfer medium after it has been adhered to the article.

Additionally, an aqueous inkjettable composition for printing on ceramics or other glazed articles is disclosed comprising an effective amount of a chromophore, with the proviso that from about 0.6% to 50% by weight of a transition metal ion is present in the composition, and an effective amount of a humectant.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is limited only by the appended claims and equivalents thereof.

It must be noted that, as used in this specification and the appended claims, the singular forms "a," "an," and "the" include plural referents unless the content clearly dictates otherwise.

"Ceramic" shall include any substance that is made from clays or clay-like materials and can be permanently hardened, fused, or vitrified by heat. For example, porcelain would fit within the present definition, as porcelain is a ceramic that can be fired to become a hard and vitrified translucent article.

"Article" shall include any substrate that can be printed on and withstand the heat associated with firing in accordance with the present invention. Though it is preferred that the article be comprised of a ceramic, other articles are within the scope of the present invention, e.g., metals.

"Chromophore," for purposes of the present invention, shall mean any substance that imparts a color to an article after being fired. Some chromophores have no significant color prior to firing. Other chromophores impart some color prior to firing. However, all chromophores described herein with respect to the present invention provide color to an article after firing that can even be of a different hue than any color present prior to firing. Typical compounds that can be used as chromophores include salts of polyvalent metals. The metal ion of the salt will typically impart the color to the ceramic article after firing. Preferred metal ions include transition metal ions and as well as metal ions from the lanthanide series and the actinide series. For example, cobalt, iron, chromium, copper, manganese, nickel, uranium, lead, gold, molybdenum, silver, tin, vanadium, cesium, and neodymium ions can be used. This list is not intended to be limiting as chromophores can include other salts of polyvalent metals known in ceramic art. See, *Ceramics Handbook, a Guide to Glaze Calculation, Materials and Processes,* Charles McKee, Star Publishing Company, Belmont, Calif., 1984.

"Glazing material" or "glaze base" shall include any material used to coat an article that, when heated or fired, will harden, fuse, or vitrify upon cooling. Glazing materials can include or exclude the presence of chromophores.

"Underprinting agent" or "fixer" includes any chemical that interacts with the chromophore compound to form an insoluble precipitate at or near the surface of the glazing fluid or article itself, or otherwise alters the solubility and/or mobility of the chromophore. Though the use of an underprinting agent (typically within a primer fluid or admixed with a glazing material) is not required, it often intensifies the color of the chromophore because of the immobilization of the chromophore at or near the surface of the glaze. Appropriate underprinting agents can include compounds having an effective amount of certain salts in an aqueous medium including salts whose anions form insoluble precipitates with polyvalent metals. For example, carbonates (e.g., sodium carbonate, potassium carbonate, etc.), phosphates, sulfates, and silicates can be good underprinting agents. The use of an underprinting agent can also fix an image so that a printed image is less likely to undergo image degradation, e.g., blooming, running, feathering, smearing, etc.

"Transfer medium" can include any material, whether natural or synthetic, that can be printed on and adhered or placed in close proximity to a ceramic article such that the printed image can be transferred to the ceramic article. Examples of suitable transfer mediums include papers, plastics, fabrics, and cloths.

"Transition metal" shall include all of the metals found in groups IB through VIIIB on the periodic chart, and specifically is intended to include the metal ions from the lanthanide series and the actinide series.

"Primer" can include any fluid that contains an underprinting agent. The fluid can be a glaze, but is preferably a less viscous liquid that is easily jettable from an ink jet printer.

The jetting of chromophores onto ceramics and other media can provide an effective means of coloring these types of substrates. One important application for this technology can be found in the area of the visual arts, e.g., coloring porcelains or custom tiles. Other applications can include the use of ceramics having printed matter thereon for various signs, e.g., street or road signs.

Fluid glazing material for coloring ceramics (or other articles) typically contain several components. One of these components is the chromophore. Chromophores found in typical ceramic glazing liquids can include one or more salts of the transition metals, e.g., cobalt, iron, chromium, copper, manganese, nickel, uranium, lead, gold, molybdenum, silver, tin, vanadium, cesium, and neodymium.

Chromophores are important to the glazing process because they can provide the color to a glazed article. These chromophores, as well as some of the other ingredients typically found in liquid glazing material, are known and can be ascertained by one or more of a considerable number of the glaze recipes published. See, *Ceramics Handbook,* Charles McKee, Star Publishing Company, Belmont, Calif., 1984; *Glazes and Glazing Techniques,* Greg Daly, 1995, Kangaroo Press, Australia.

Normally, components of a glazing material are mixed in total, dispersed or dissolved in water, and then applied to ceramics by spraying, dipping, or by brushing. The piece is then heated in an oven or a kiln at from 571° C. (the inversion temperature of quartz) to 1400° C., depending on the specific glazing material used. This process, known as "firing" can occur for several hours until the fluid glazing material fuses.

However, prior to the present invention, chromophores, separate from other components of the liquid glazing material, have not been digitally jetted from an ink jet pen to give color to ceramic glazes. Thus, chromophores typically found in liquid glazing material can be made to be inkjettable such that the chromophores can be deposited onto a ceramic article separately from the rest of the glaze material. This is advantageous over the jetting of the entire liquid glazing material because good pen reliability can be more easily achieved. The high solids content and high viscosity of normal glazes make application by jetting difficult. Thus, by using bulk application methods for some of the glazing material and jetting the chromophores, a more efficient and cost effective method of color application can be effectuated. This is partly because the chromophores are often, by many times, the most expensive glaze component. In other words, by coating a ceramic (or other) article with the more viscous and less soluble glaze components in the typical manner, e.g., dipping, brushing, and spraying, one can take advantage of digital printing by jetting chromophores without having to jet the more viscous components of the liquid glazing material.

Thus, the present invention is drawn to methods for digitally printing on an article, such as a ceramic article. One preferred method comprises the steps of applying a fluid glazing material to an article creating a coated surface on the article, jetting a chromophore-containing fluid onto the coated surface, and firing the article. Optionally, an underprinting agent can be applied to the fluid glazing material in one of two preferred ways. First, the fluid glazing material can contain or be admixed with the underprinting agent.

Second, a fluid primer containing the underprinting agent can be jetted onto the coated surface. In any event, the fluid primer can contact the chromophore-containing fluid prior to, or during the firing process. Though it is not required, it is also preferred that the fluid glazing material be allowed to substantially dry prior to applying the chromophore-containing fluid. This is likewise true for the underprinting agent, if jetted in the form of a primer. Though any glazed article can be printed on, it is preferred that the article be a ceramic article.

In another embodiment, a method for digitally printing on an article is disclosed comprising applying a fluid glazing material to the article creating a coated surface, jetting an chromophore-containing fluid onto a transfer medium, adhering the transfer medium to the coated surface, and firing the article. In one embodiment, a coating of glaze can be applied over the transfer medium after it has been adhered to the article.

In any of the above methods, or in any other similar method within the scope of the present invention, if an underprinting agent or fixer is used, then the underprinting agent can include an effective amount of an appropriate salt in an aqueous media. As possible underprinting agents, salts whose ions form insoluble precipitates with polyvalent metals can be used including carbonates, phosphates, sulfates, and silicates. When applied by jetting, from about 0.1% to 10% by weight of the underprinting agent to water is preferred, though other ingredients can be present. Specifically, if a carbonate salt is used, then sodium carbonate and/or potassium carbonate are appropriate choices for use.

The chromophore-containing fluid that is jetted onto the substrate, e.g., transfer medium, glaze, or to the ceramic article itself, can be comprised of a transition metal (or inner-transition metal) salt as the chromophore. Examples of appropriate salts can include, but are not limited to, nitrates, chlorides, acetates, chromates, citrates, and sulfates. For example, cobalt(II) nitrate, cobalt(II) chloride, cobalt(II) acetate, cobalt(II) chromate, cobalt(II) citrate, and/or cobalt (II) sulfate could be used. Other suitable compositions can include iron(III) nitrate, chromium(III) nitrate, copper(II) nitrate, manganese(II) nitrate, nickel (II) nitrate, and/or uranyl nitrate, to name a few effective nitrate salts. The chromophore is typically included in a fluid vehicle that can contain any functional combination of solvents known in the art. For example, 2-pyrrolidone, 1,5-pentanediol, and/or trimethylolpropanol can be included in the aqueous fluid vehicle. Though any functional concentration of chromophores can be used in the aqueous fluid vehicle, from about 0.1% to 50% of metal ion content (from the chromophores) to aqueous vehicle by weight is preferred for use with the methods described herein. Though this board range is functional with the methods of the present invention, it is preferred that the novel compositions described herein be used. For example, the use of compositions having from 0.6% to 50% by weight of metal ions present is more preferred. Additionally, most preferred is the use of compositions having from 5% to 40% by weight of metal ions present.

As some of these chromophore-containing fluids lack significant color prior to firing, dyes or pigments can be added to the chromophore-containing fluid to give the fluid color. Once fired, the ink is typically burned off and the chromophore provides the visible color.

The fluid glazing material used can include $Al_2O_3$, $SiO_2$, $SnO_2$, $TiO_2$, $ZrSiO_4$, and/or $MgAl_2O_4$, though other ingredient can be present. Thus, any functional fluid glazing materials as are known in the art can be used. In fact, though an aspect of the invention discloses the jetting of chromophores onto a glaze, a ceramic body, or onto a transfer medium for transfer to the ceramic, chromophores can also be present in the fluid glazing material itself. Thus, a combination of chromophores in the fluid glazing material and chromophores jetted onto the fluid glazing material is within the scope of the present invention.

Once the chromophore-containing fluid has been jetted or transferred to the coated ceramic article, the ceramic article can be fired (or placed in a kiln at very hot temperatures). With any of the methods described herein, firing can occur at from 571° to 1400° C. for from 1 to 72 hours.

To show an example of how a method of the present invention can be implemented, one can take a white glaze of the following composition (as described in McKee's book referenced above): Nepheline Syenite 30%, Whiting 26%, Silica 30%, and Kaolin 14%. The glazing fluid can then be applied to a ceramic clay article, the water evaporated, and then a pattern applied with a jettable chromophore-containing fluid. Once fired, the pattern will appear as a permanent color.

Binders or additives, e.g., polyvinyl alcohol, carboxymethyl cellulose, or starches, can be added to the chromophore-containing fluid in order to help the chromophores to stick to the unfired glazed ceramic. These binders will typically burn off during the firing process. Alternatively, as stated, the jettable chromophores can also be printed onto a transfer medium, e.g., plastic, paper, cloth, etc. The transfer medium can then be adhered or contacted with a glazed surface and then fired. In one embodiment, the transfer medium, upon firing, will burn away leaving a mirror image of the chromophore-containing image.

Additionally, an aqueous inkjettable composition is disclosed that can be used with the methods described herein. However, the methods described herein can utilize other functional compositions outside the scope of these novel compositions. The present composition comprises an effective amount of a chromophore with the proviso that from about 0.6% to 50% by weight of a transition metal ion be present. Additionally, an effective amount of a humectant and water must also be present. More preferably, the transition metal ion can be present at from about 5% to 40% by weight. Though all that is required for the present inkjettable compositions is the required amount of metal ion and a humectant, other ingredients such as co-solvents, biocides, buffers, viscosity modifiers, and/or surfactants can also be present, as are known by those skilled in the art.

The humectant comprises any single humectant or combination of humectants commonly employed in ink jet printing. Organic solvents suitably employed in the present invention include, but are not limited to, glycols, such as ethylene glycol, diethylene glycol, triethylene glycol and tetraethylene glycol; glycerol and related derivatives such as polyethoxylated glycerols; lactams, such as N-methyl pyrrolidone; lactones, such as butyrolactone; alkanolamines, such as diethanolamine and triethanolamine; diols such as 1,2-propanediol, 1,3-propanediol, 1,2-butanediol, 2,3-butanediol, 1,4-butanediol, and hexylene glycol (2-methyl-2, 4-pentanediol); other isomers of pentanediol and hexanediol such as 1,5-pentanediol and 1,6-hexanediol; triols, such as 1,2,6-hexanetriol; mono- and di-glycol ethers, such as ethylene glycol monobutyl ether; imidazoles, such as 1,3-dimethyl-2-imidazolidinone; sulfones, such as dimethylsulfone, tetramethylene sulfone, and 2,2'-sulfonyldiethanol; organosulfoxides, such as methylsulfoxide; organosulfides, such as 2,2'-thiodiethanol; trimethylolpropane; triethylolethane; urea and its derivatives; and the like and mixtures thereof. No matter what humectant or combination of humectants used, the humectant(s) can be present at from 5% to 90% by weight.

EXAMPLES

The following examples illustrate various formulations and method techniques for jetting chromophore-containing fluids onto substrates for providing colors to ceramic glazes. The following examples should not be considered as limitations of the present invention, but should merely teach the methods of the present invention.

Example 1

The following fluid vehicle was prepared for jetting chromophores onto ceramic media. Each of the fluid vehicle components are represented by weight percentages in Table 1 below:

TABLE 1

| INGREDIENT | WT % |
|---|---|
| 2-pyrrolidone | 7.5 |
| 1,5-pentanediol | 8 |
| Trimethylolpropane | 7.5 |
| Water | Balance |

Four different chromophore-containing compositions were prepared, each comprising a chromophore, sodium carbonate as an underprinting agent, and the fluid vehicle of Table 1. In each composition, about 3% of each chromophore by weight, 3% of sodium carbonate by weight, and the balance being the fluid vehicle, was prepared. The four chromophores used in the four compositions were iron(III) nitrate, chromium(III) nitrate, cobalt(II) nitrate, and copper (II) nitrate. The transition metal ion concentration of each composition is illustrated below.

TABLE 2

| Chromophore | Metal Ion Concentration (Wt %) |
|---|---|
| iron (III) nitrate | 0.69% $Fe^{3+}$ |
| chromium (III) nitrate | 0.66% $Cr^{3+}$ |
| cobalt (II) nitrate | 0.97% $Co^{2+}$ |
| copper (II) nitrate | 1.02% $Cu^{2+}$ |

Each of the four above compositions were filled into empty Black HP 51645A printheads and printed on paper using a DeskJet™ 970 Cxi Hewlett Packard™ printer. No problems with the printhead performance were observed.

Example 2

A cloud-white Hayco™ series 2000 liquid glaze S-2565 was deposited onto a 2 inch×2 inch ceramic tile with a brush. The liquid glaze was allowed to stand for 2 hours until it was dry. Four 0.1 ml drops of sodium carbonate solution were pipetted onto four different locations on the liquid glaze coated ceramic tile. Next, 0.1 ml drops of iron(III) nitrate, chromium(III) nitrate, cobalt(II) nitrate, and copper(II) nitrate solution were individually pipetted on top of a sodium carbonate drop. Additionally, as a control, 0.1 ml drops of iron(III) nitrate, chromium(III) nitrate, cobalt(II) nitrate, and copper(II) nitrate solution were deposited individually onto the tile directly. Thus, the tile had a total of eight drops being tested. The tile was placed in a kiln and annealed at approximately 1000° C. for 12 hours.

The drops of iron(III) nitrate, chromium(III) nitrate, cobalt(II) nitrate, copper(II) nitrate turned yellow, grass-green, deep blue, and bluish-green, respectively. The samples where sodium carbonate was used as an underprinting agent provided considerably more intense coloration.

Example 3

Cobalt(II) nitrate was dissolved in the ink vehicle described in Example 1 at 20% by weight. This chromophore-containing fluid was filled into an empty Black IIP 51645A printhead manufactured by Hewlett-Packard. As this chromophore-containing fluid is relatively clear in color prior to annealing, the composition was tinted with 1% by weight of Acid Blue-9 to help with its pre-firing visualization. The composition was printed on Gilbert™ Bond office paper and several text patterns were cut and adhered to a ceramic tile that was pre-coated with cloud-white Hayco™ series 2000 glaze S-2565. The printed paper was adhered to the pre-coated ceramic tile with an aqueous solution containing 5% by weight of sodium carbonate mixed with an aqueous solution containing 5% by weight of a polyvinyl alcohol (M=25,000) at a 1:1 ratio by weight. The tile was annealed in a furnace at approximately 1000° C. for 12 hours. After removing the ceramic tile from the kiln, mirror images of the text patterns were seen on the tile in a blue color, due to the presence of the chromophores. The Acid Blue 9 burned off in the firing process.

Example 4

A inkjettable composition was prepared which consisted of 30% nickel(II) nitrate by weight; 5% diethylene glycol by weight, and the balance in water. This composition was shown to be jettable and functional for use in printing on ceramic or other glazed articles.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A method for digitally printing on an article comprising:
   (a) applying a fluid glazing material to an article creating a coated surface on the article;
   (b) jetting an aqueous chromophore-containing fluid onto the coated surface; and
   (c) firing the article after the jetting step.

2. A method as in claim 1 wherein the fluid glazing material contains an underprinting agent.

3. A method as in claim 1 further comprising the step of jetting a fluid primer containing an underprinting agent onto the coated surface, such that the fluid primer contacts the aqueous chromophore-containing fluid.

4. A method as in claim 1 wherein the article is a ceramic.

5. A method as in claim 1 wherein the aqueous chromophore-containing fluid comprises a transition metal salt.

6. A method as in claim 5 wherein the transition metal salt is selected from the group consisting of nitrates, chlorides, acetates, chromates, citrates, sulfates, and combinations thereof.

7. A method as in claim 5 wherein the metal ion provided by the transition metal salt is selected from the group consisting of cobalt, iron, chromium, copper, manganese, nickel, uranium, lead, gold, molybdenum, silver, tin, vanadium, cesium, neodymium, and combinations thereof.

8. A method of claim 1 wherein an additional coating selected from the group consisting of a glaze, an adhesive, a colorant, and a reflective material is applied prior to firing.

* * * * *